(12) United States Patent
Densham (10) Patent No.: US 8,502,503 B2
(45) Date of Patent: Aug. 6, 2013

(54) CIRCUITS AND METHODS FOR PROTECTION OF BATTERY MODULES

(75) Inventor: William Densham, Los Gatos, CA (US)

(73) Assignee: O2Micro Inc., Santa Clara, CA (US)

( * ) Notice: Subject to any disclaimer, the term of this patent is extended or adjusted under 35 U.S.C. 154(b) by 282 days.

(21) Appl. No.: 12/639,908

(22) Filed: Dec. 16, 2009

(65) Prior Publication Data

US 2010/0157495 A1 Jun. 24, 2010

Related U.S. Application Data

(60) Provisional application No. 61/138,618, filed on Dec. 18, 2008.

(51) Int. Cl.
*H02J 7/00* (2006.01)
*H02J 7/04* (2006.01)

(52) U.S. Cl.
USPC ........... 320/122; 320/116; 320/134; 320/148; 320/156

(58) Field of Classification Search
USPC .................. 320/134, 135, 136, 116, 119, 128, 320/120, 121, 122, 137, 148, 149, 156
See application file for complete search history.

(56) References Cited

U.S. PATENT DOCUMENTS

| | | | |
|---|---|---|---|
| 5,808,444 A * | 9/1998 | Saeki et al. | 320/117 |
| 5,886,502 A | 3/1999 | Higashijima | |
| 6,051,955 A | 4/2000 | Saeki et al. | |
| 6,396,245 B1 | 5/2002 | Jeong et al. | |
| 6,879,133 B1 * | 4/2005 | Geren | 320/134 |
| 7,508,171 B2 * | 3/2009 | Carrier et al. | 320/138 |
| 2005/0077878 A1 * | 4/2005 | Carrier et al. | 320/134 |
| 2005/0242779 A1 * | 11/2005 | Yoshio | 320/134 |
| 2007/0188149 A1 * | 8/2007 | Miyamoto | 320/134 |
| 2008/0084182 A1 * | 4/2008 | Oberlin et al. | 320/116 |
| 2008/0218127 A1 * | 9/2008 | Kao et al. | 320/134 |
| 2008/0238370 A1 * | 10/2008 | Carrier et al. | 320/134 |

FOREIGN PATENT DOCUMENTS

| | | |
|---|---|---|
| JP | 2001-112182 A | 4/2001 |
| JP | 2008-206250 A | 9/2008 |

* cited by examiner

*Primary Examiner* — Edward Tso
*Assistant Examiner* — Alexis Boateng (57) ABSTRACT

A circuit includes multiple battery modules and protection circuits respectively coupled to the battery modules. Each protection circuit includes a controller and a shunt circuit. The controller is coupled to one of the battery modules and detects a fault associated with the battery module. The shunt circuit is coupled to the battery module and the controller, and shunts a current around the battery module if the fault associated with the battery module is detected by the controller.

20 Claims, 6 Drawing Sheets

CIRCUITS AND METHODS FOR PROTECTION OF BATTERY MODULES

This application claims priority to the U.S. provisional application with Ser. No. 61/138,618, filed Dec. 18, 2008, hereby incorporated by reference in its entirety.

BACKGROUND

Electrical devices such as power tools and electrical vehicles may be powered by battery packs. Multi-cell battery packs may encounter an open connection, e.g., open connection between the battery cells or battery modules. If the battery pack is operated with an open connection, the full battery pack voltage may appear across the open connection. The resultant high voltage may cause errors or failures of measurement circuits such as cell voltage measurement circuits in the battery pack. The open connection may cause the battery pack to shut down as the battery management system will not have communications to all or part of the battery pack. Consequently, the battery pack would not be able to supply power to a load, for example, an automotive system. As a result, the automotive system may experience a failure to start or operate.

SUMMARY

A circuit includes multiple battery modules and protection circuits respectively coupled to the battery modules. Each protection circuit includes a controller and a shunt circuit. The controller is coupled to one of the battery modules and detects a fault associated with the battery module. The shunt circuit is coupled to the battery module and the controller, and shunts a current around the battery module if the fault associated with the battery module is detected by the controller.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

According to one embodiment of present invention, a set of protection circuits are capable of protecting a set of battery modules from a fault or an undesired condition, e.g., an open connection or a loose connection between the battery cells or battery modules. Each protection circuit is coupled in parallel with a corresponding battery module, and includes a controller and a shunt circuit, in one embodiment. The controller monitors the status of a corresponding battery module and detects whether there is a fault or an undesired condition occurred in the corresponding battery module. In other words, the controller can identify the battery module associated with the fault or undesired condition as a fault battery module. When the fault or undesired condition is detected by the controller, the shunt circuit shunts a current around the fault battery module. As such, the fault battery module can be shorted out while the remaining normal battery modules can still function, e.g., providing power or being charged. Since the battery pack is not completely shut down, a battery management system can communicate with at least a part of the battery pack. Moreover, sustained by the reduced power, the battery management system can have time to send fault warning signals and/or execute corrective actions to resolve the detected fault, in one embodiment.

Figure 1:
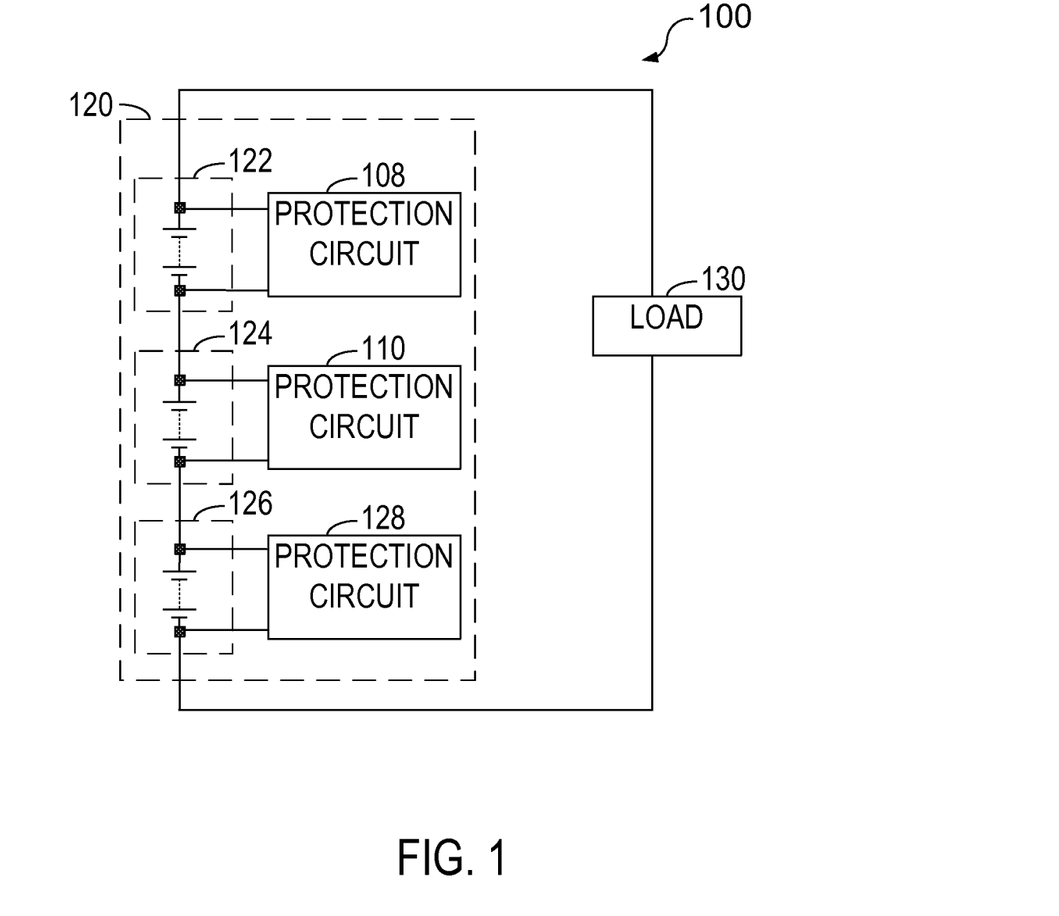
FIG. 1 shows a diagram of a system with an enhanced battery pack, in accordance with one embodiment of the present invention.

FIG. 1 shows a diagram of a system 100 with an enhanced battery pack, in accordance with one embodiment of the present invention. The system 100 includes a battery pack 120 and a load 130. The battery pack 120 includes multiple battery cells and provides power to the load 130. The battery cells can be coupled in series, parallel or a mixture of both to deliver a desired voltage, capacity, or power to the load 130. In one embodiment, the battery cells are divided into several battery modules. In the example of FIG. 1, the battery pack 120 comprises battery modules 122, 124 and 126. Each battery module can include one or more battery cells. In one embodiment, each battery module further includes a positive terminal and a negative terminal, which can couple the battery module to adjacent battery modules. The number of battery modules in FIG. 1 is for the purpose of illustration but not limitation. The battery pack 120 can include an arbitrary number of battery modules.

In the battery pack 120, the battery modules 122, 124 and 126 are coupled to the protection circuits 108, 110 and 128 respectively via the positive and negative terminals. The protection circuits 108, 110 and 128 protect the battery pack 120 from a fault or an undesired condition, e.g., an open connection between the battery cells. The protection circuits 108, 110 and 128 are similar to one another.

Figure 2:
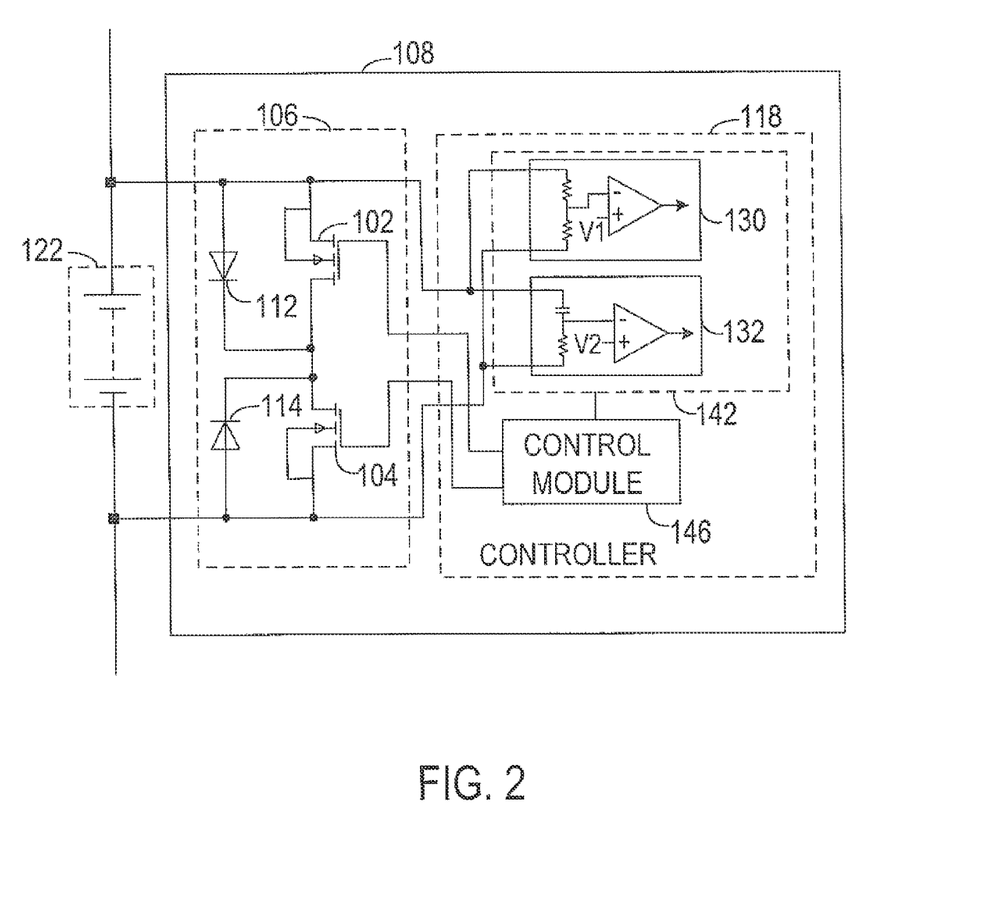
FIG. 2 shows a diagram of a protection circuit, in accordance with one embodiment of the present invention.

FIG. 2 shows the protection circuit 108, in accordance with one embodiment of the present invention. The protection circuit 108 includes a shunt circuit 106 and a controller 118.

In one embodiment, the controller 118 continuously monitors a status of the battery module 122. The controller 118 can detect an open connection between the battery cells in the battery module 122 based on the status of the battery module 122. In one embodiment, the controller 118 includes a detection module 142 and a control module 146. The detection module 142 detects the open connection in the battery module 122 based on the status of the battery module 122. The control module 146 enables the shunt circuit 106 to shunt a current around the battery module 122 if the open connection in the battery module 122 is detected by the detection module 142.

Figure 3A:
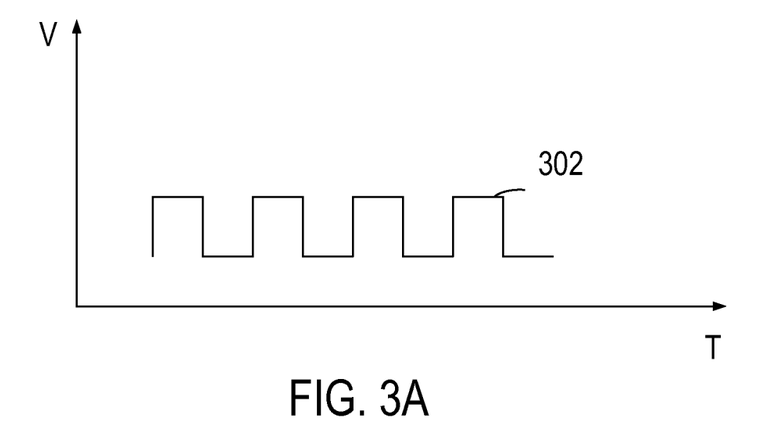
FIG. 3A shows a waveform of a module voltage in a normal condition, in accordance with one embodiment of the present invention.

FIG. 3A shows a waveform of a module voltage across a battery module, e.g., the battery module 122, in a normal condition. FIG. 3A is described herein with reference to FIG. 1 and FIG. 2. In FIG. 3A, the x-axis represents the time and the y-axis represents the module voltage across the battery module 122. In the example of FIG. 3A, the waveform is a square wave 302, as the power delivered from the battery pack 120 to the load 130 in FIG. 1 can be controlled by a switch (not shown in figures) using a pulse-width modulation (PWM) signal. In one embodiment, the frequency of the square wave 302 can be varied by varying the duty cycle of the PWM signal. Meanwhile, the amplitude of the square wave 302 can be varied based on the state of charge (SOC) and state of health (SOH) of the battery cells in the battery module 122.

Figure 3B:
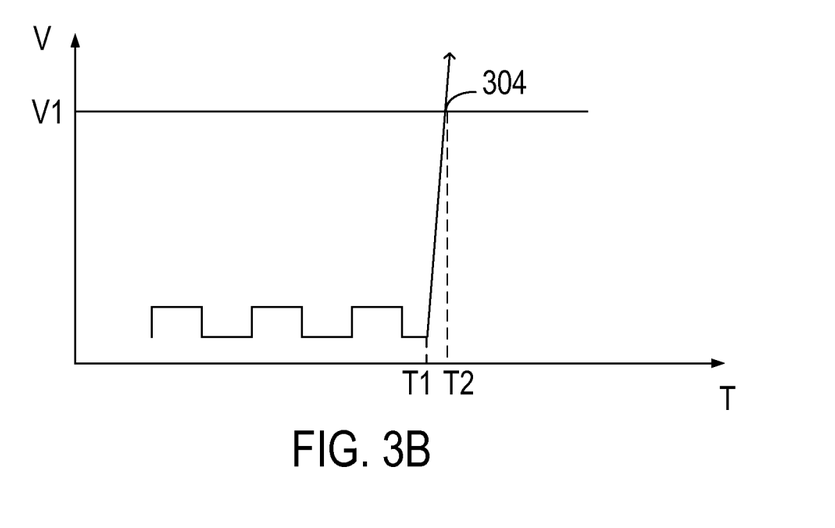
FIG. 3B shows a waveform of a module voltage in an open connection condition, in accordance with another embodiment of the present invention.

FIG. 3B shows a waveform of the module voltage across a battery module, e.g., the battery module 122, in an open connection condition. FIG. 3B is described herein with reference FIG. 2. In FIG. 3B, the x-axis represents the time and the y-axis represents the module voltage across the battery module 122. If an open connection between the battery cells in the battery module 122 occurs at time $T_1$, the slope of a waveform 304, which stands for the voltage change rate of the module voltage, is changed accordingly. Meanwhile, because of the relatively high voltage across the open connection, the module voltage may exceed a voltage threshold $V_1$ at time $T_2$.

Referring back to FIG. 2, in one embodiment, the detection module 142 includes a voltage detector 130 and/or a voltage change rate (dv/dt) detector 132. FIG. 2 shows examples of the voltage detector 130 and the voltage change rate (dv/dt) detector 132. The voltage detector 130 detects the module voltage of the battery module 122, and compares the detected module voltage with a voltage threshold, e.g., the voltage threshold $V_1$ in FIG. 3B. In one embodiment, if the detected module voltage exceeds the voltage threshold, the detection module 142 instructs the control module 146 to output a control signal to enable the shunt circuit 106. Accordingly, the shunt circuit 106 shunts the current around the battery module 122. In other words, the battery module 122 is shorted out by the shunt circuit 106. The dv/dt detector 132 monitors the voltage change rate of the module voltage across the battery module 122 to detect the open connection condition. For example, the dv/dt detector 132 can compare the voltage change rate of the module voltage with a threshold. In one embodiment, if the voltage change rate exceeds the threshold, the dv/dt detector 132 instructs the control module 146 to output a control signal to enable the shunt circuit 106.

In one embodiment, the shunt circuit 106, coupled to the battery module 122, includes transistors 102 and 104. The transistors 102 and 104 are respectively coupled to body diodes 112 and 114. In one embodiment, the transistors 102 and 104 are coupled in series to build a current path in two directions. More specifically, if the battery module 122 encounters the open connection during a discharging process, e.g., when the battery pack 120 is powering the load 130, the transistor 104 is off and the transistor 102 is on. Thus, a current flowing through the shunt circuit 106 is in a direction from the body diode 114 to the transistor 102. If the battery module 122 encounters the open connection during a charging process, e.g., when the battery pack 120 is being charged, the transistor 104 is on and the transistor 102 is off. Thus, the current flowing through the shunt circuit is in another direction from the body diode 112 to the transistor 104.

In one embodiment, after the shunt circuit 106 is enabled, the controller 118 keeps monitoring the status of the battery module 122, and disables the shunt circuit 106 if the battery module 122 is back to the normal condition, e.g., when the module voltage drops below the voltage threshold.

In one embodiment, the detection module 142 includes either the voltage detector 130 or the dv/dt detector 132. In another embodiment, the detection module 142 includes both the voltage detector 130 and the dv/dt detector 132 to enhance safety and reliability with redundancy. More specifically, when either the voltage detector 130 or the dv/dt detector 132 detects an open connection, the control module 146 can output a control signal to enable the shunt circuit 106, in one embodiment.

In the example of FIG. 2, the protection circuit 108 is used as a standalone device. In another embodiment, the controller 118 in the protection circuit 108 is integrated into a battery management unit (BMU), which will be detailed described in relation to FIG. 4. The BMU can include multiple monitors and each of the monitors detects status, e.g., voltage, of a corresponding battery cell in the battery module 122.

Referring back to FIG. 1, the protection circuits 110 and 128 have similar structures as the protection circuit 108, respectively protecting the battery modules 124 and 126 from a fault or undesired condition, e.g., an open connection between the battery cells.

Accordingly, by detecting a status, e.g., a voltage or a voltage change rate, of a battery module in the battery pack 120, a protection circuit can detect whether the corresponding battery module suffers from a fault or an undesired condition, e.g., an open connection between the battery cells. The protection circuit further shorts out the fault battery module by a shunt circuit to avoid a relatively high voltage across the open connection. Accordingly, normal operation of measurement circuits such as cell voltage measurement circuits (not shown in FIG. 1) in the battery pack 120 can be maintained. Furthermore, the remaining normal battery modules in the battery pack 120 can still operate. As such, the battery pack 120 still provides reduced power to the load 130, rather than being shut down completely. The load 130, e.g., an automobile, can be avoided from experiencing a power failure. Moreover, sustained by the reduced power, battery management circuits can have time to send fault warning signals and/or execute corrective actions to resolve the detected fault. Such scheme provides a "Limp Home" capability desired by the automotive industry.

Figure 4:
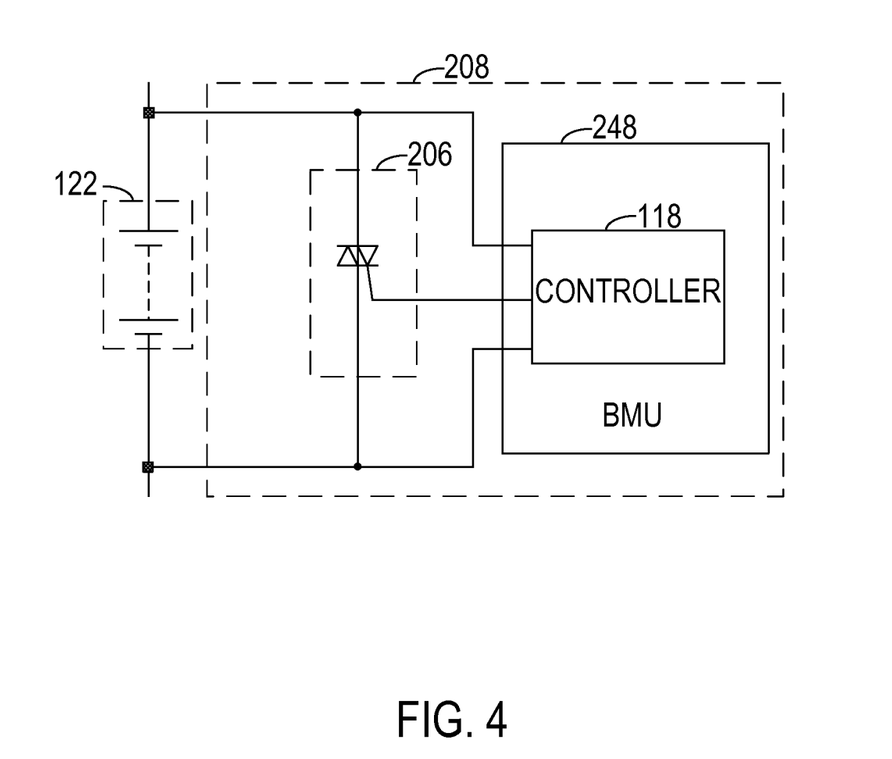
FIG. 4 shows a diagram of a protection circuit, in accordance with another embodiment of the present invention.

FIG. 4 shows a protection circuit 208, in accordance with another embodiment of the present invention. The protection circuit 208 includes a shunt circuit 206 and a BMU 248. The shunt circuit 206 can be a silicon controlled rectifier (SCR), a triode AC (alternating current) semiconductor switch (TRIAC), or the like. The shunt circuit 206 is coupled in parallel with the battery module 122.

Different from the standalone protection scheme in FIG. 2, the controller 118 is integrated into the BMU 248 to realize a BMU integrated protection scheme. Accordingly, the BMU 248 is capable of detecting and responding to an open connection in the battery pack 120. In one embodiment, the BMU 248 detects the variation in the module voltage across the battery module 122 or the voltage change rate of the module voltage, and enables/disables the shunt circuit 206 accordingly. If the open connection occurs internal to the battery module 122, the shunt circuit 206 shunts the current around the battery module 122. In this instance, the battery module 122 is shorted out by the shunt circuit 206. The remaining normal battery modules, e.g., the battery modules 124 and 126, can keep supplying reduced power to maintain operation of the system 100.

Figure 5:
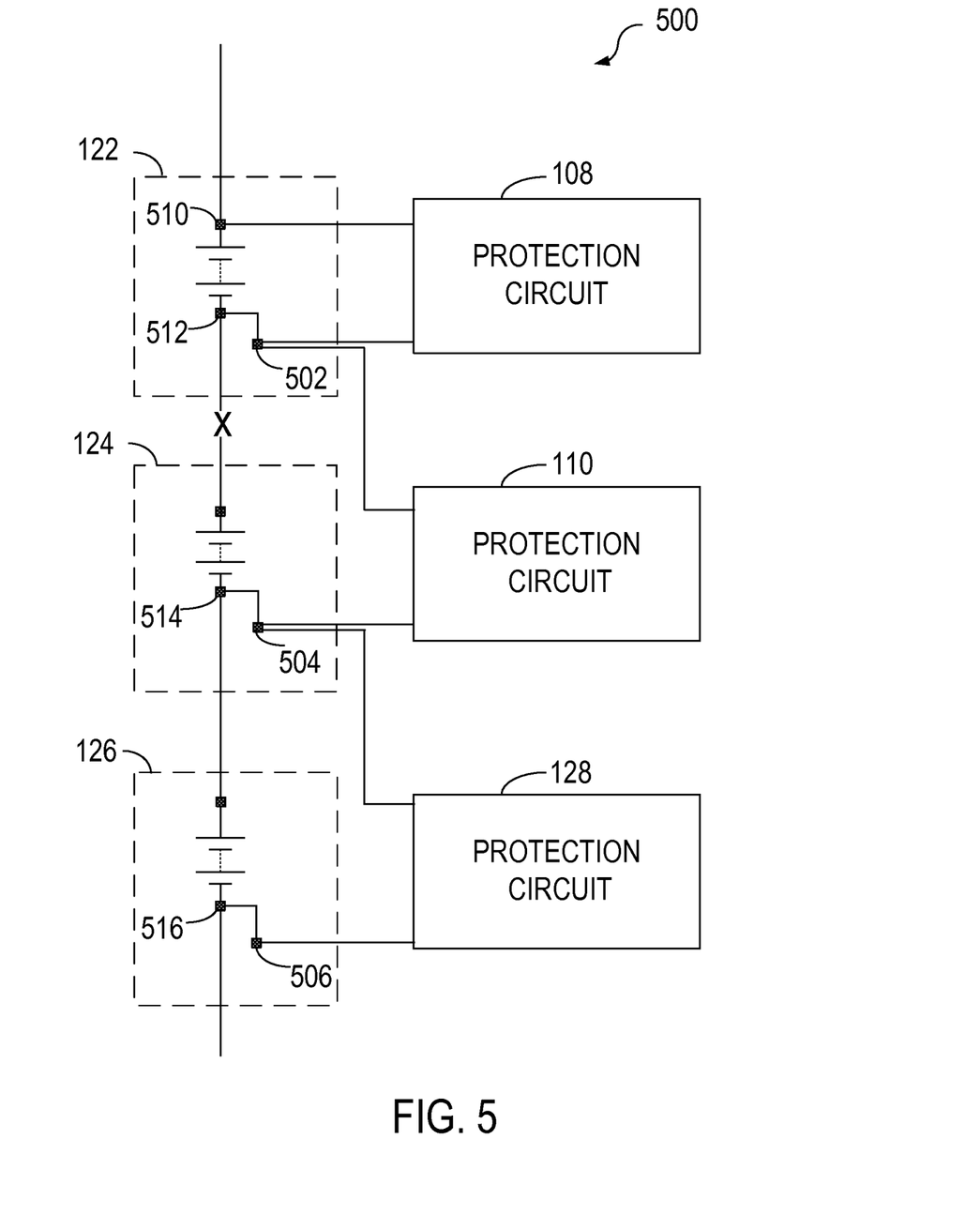
FIG. 5 shows a diagram of an enhanced battery pack, in accordance with another embodiment of the present invention.

FIG. 5 illustrates an enhanced battery pack 500, in accordance with another embodiment of the present invention. Besides the battery modules 122, 124 and 126, and the protection circuits 108, 110 and 128, the battery pack 500 further includes redundant terminals 502, 504 and 506. The redundant terminal 502 is coupled to a negative terminal 512 of the battery modules 122. The redundant terminal 504 is coupled to a negative terminal 514 of the battery modules 124. The redundant terminal 506 is coupled to a negative terminal 516 of the battery modules 126. The protection circuits are coupled to the battery modules via the redundant terminals, instead of being coupled to the negative and positive terminals of the battery modules directly, except that a positive terminal 510 of the top battery module 122 is coupled to the protection circuit 108 directly. With such configuration, a battery module, corresponding redundant terminals and lines between the redundant terminals can be treated as an integral component, e.g., a black box, to cooperate with a corresponding protection circuit.

Advantageously, if there is an open connection between the battery modules, the protection circuits can still identify a fault battery module suffering from such open connection and shunt the current around the fault battery module. For example, there is an open connection between the battery modules 122 and 124, the protection circuit 110 can detect such open connection by sensing voltages via the redundant terminals 502 and 504. Accordingly, the current is shunted around the battery module 124. Furthermore, as mentioned above in relation to FIG. 2, the open connection between the battery cells in each battery module can be detected by the corresponding protection circuit. As such, both the open connection between the battery modules and the open connection within the battery modules can be detected by the protection circuits, and therefore the reliability of the protection circuits is further enhanced.

In one embodiment, the redundant terminals 502, 504 and 506 are identical to the negative terminals 512, 514 and 516, respectively. For example, the redundant terminals may have practically the same current carry capability with the negative terminals. Furthermore, the number of battery modules in FIG. 5 is for the purpose of illustration but not limitation. The battery pack 500 can include an arbitrary number of battery modules.

Alternatively, the redundant terminals can be coupled to positive terminals of the battery modules respectively. The protection circuits are coupled to the battery modules via the redundant terminals, instead of being coupled to the negative and positive terminals of the battery modules directly, except that a negative terminal of the bottom battery module is coupled to the corresponding protection circuit directly. The battery pack with such configuration operates in a way similar to the battery pack 500 of FIG. 5.

The protection circuits in accordance with embodiments of the present invention can be also used to detect a loose connection or other similar types of faults or undesired conditions associated with the battery pack 120.

Figure 6:
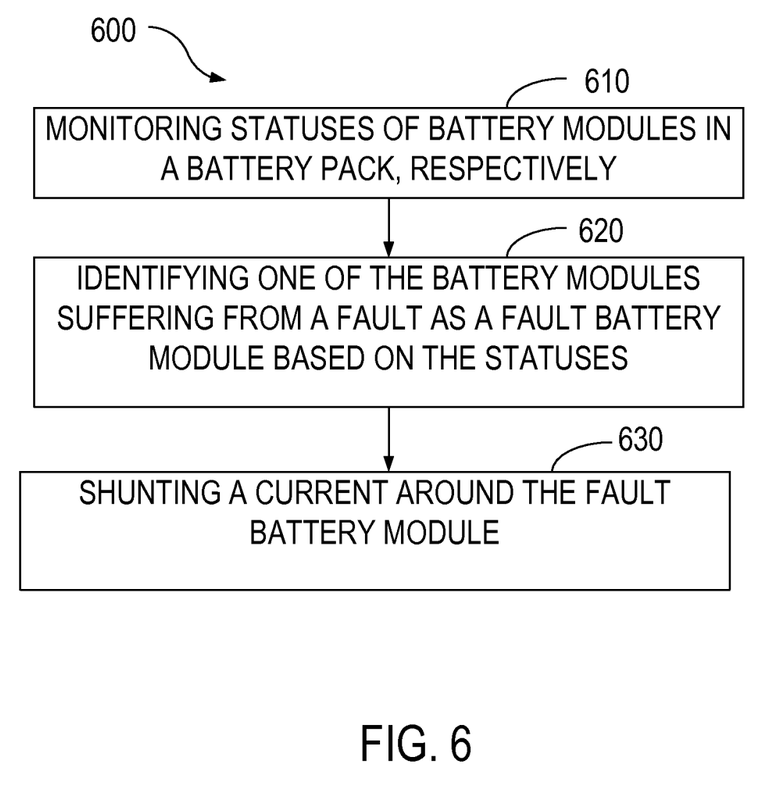
FIG. 6 shows a flowchart of a method for protecting a battery pack, in accordance with one embodiment of the present invention.

Referring to FIG. 6, a method 600 for protecting a battery pack is illustrated, in accordance with one embodiment of the present invention. Although specific steps are disclosed in FIG. 6, such steps are exemplary. That is, the present invention is well suited to performing various other steps or variations of the steps recited in FIG. 6. FIG. 6 is described in combination with FIG. 1 and FIG. 2.

In block 610, statuses of the battery modules in the battery pack are monitored, respectively. For example, a protection circuit 108 coupled to a battery module includes a voltage detector 130 monitoring the module voltage of the battery module, and/or a dv/dt detector 132 monitoring the voltage change rate of the module voltage across battery module, to detect an open connection of the battery module.

In block 620, a battery module suffering from a fault is identified as a fault battery module based on the statuses. When a fault, e.g., an open connection, associated with the battery module 122 is occurred, the controller 118 can detect the presence of the fault and identify the battery module 122 as the fault battery module. In one embodiment, if the detected module voltage of the battery module 122 exceeds a voltage threshold, the controller 118 identifies the battery module 122 as a fault battery module.

In block 630, a current is shunted around the fault battery module. For example, the controller 118 enables the shunt circuit 106 to shunt the current around the battery module 122. In one embodiment, if the battery module 122 encounters an open connection during a discharging process, a current flowing through the shunt circuit 106 is in one direction. If the battery module 122 encounters an open connection during a charging process, the current flowing through the shunt circuit is in the other direction. Advantageously, the remaining normal battery modules in the battery pack 120 can still provide a reduce power to the load 130, rather than being shut down completely.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A circuit comprising:
a plurality of battery modules; and
a plurality of protection circuits coupled to said battery modules respectively, said protection circuits each comprising:
a controller coupled to a battery module of said battery modules and operable for detecting a fault associated with said battery module; and
a shunt circuit coupled to said battery module and said controller and operable for shunting a current around said battery module if said fault associated with said battery module is detected by said controller, wherein said current flows from a negative terminal of said battery module to a positive terminal of said battery module through said shunt circuit if said fault occurs during a discharging process of said battery modules, and wherein said current flows from said positive terminal of said battery module to said negative terminal of said battery module through said shunt circuit if said fault occurs during a charging process of said battery modules.

2. The circuit of claim 1, wherein said controller comprises a voltage detector coupled to said battery module and operable for detecting a module voltage across said battery module and for comparing said module voltage with a voltage threshold to determine presence of said fault.

3. The circuit of claim 1 herein said controller comprises a voltage change rate detector coupled to said battery module and operable for detecting a voltage change rate of a module voltage across said battery module to determine presence of said fault.

4. The circuit of claim 1, wherein said circuit is operable for detecting a status of said battery module and for identifying said battery module as a fault battery module based on said status.

5. The circuit of claim 1, wherein said battery modules are coupled in series, and wherein said fault comprises an open circuited condition in the series-coupled battery modules.

6. The circuit of claim 1, wherein if said fault associated with said battery module is detected by said controller, said battery module is shorted out by said shunt circuit.

7. The circuit of claim 1, wherein said shunt circuit comprises a bidirectional current path.

8. The circuit of claim 7, wherein said bidirectional current path comprises a first switch and a second switch coupled in series, a first diode coupled in parallel with said first switch, and a second diode coupled in parallel with said second switch,
wherein if said fault occurs during said discharging process, said first switch is off, said second switch is on, and said current flows through said first diode and said second switch,
and wherein if said fault occurs during said charging process, said first switch is on, said second switch is off, and said current flows through said second diode and said first switch.

9. The circuit of claim 7, wherein said bidirectional current path is selected from the group consisting of a silicon-controlled rectifier (SCR) and a triode alternating current (TRIAC) switch.

10. A method, implemented on a circuit having a plurality of battery modules, and a plurality of protection circuits coupled to said battery modules respectively, said protection circuits each comprising a controller coupled to a battery module of said battery modules, and comprising a shunt circuit coupled to said battery module and said controller, said method comprising:
  detecting, using said controller, a fault associated with said battery module; and
  shunting, using said shunt circuit, a current around said battery module if said fault associated with said battery module is detected by said controller, wherein said shunting comprises:
    controlling said current to flow from a negative terminal of said battery module to a positive terminal of said battery module through said shunt circuit if said fault occurs during a discharging process of said battery modules; and
    controlling said current to flow from said positive terminal of said battery module to said negative terminal of said battery module through said shunt circuit if said fault occurs during a charging process of said battery modules.

11. The method of claim 10, wherein said detecting of aid fault comprises:
  detecting a module voltage across said battery module; and
  comparing said module voltage with a voltage threshold to determine presence of said fault.

12. The method of claim 10, wherein said detecting of said fault comprises:
  detecting a voltage change rate of a module voltage across said battery module to determine presence of said fault.

13. The method of claim 10, wherein said battery modules are coupled in series, and wherein said fault comprises an open circuited condition in the series-coupled battery modules.

14. A circuit comprising:
  a battery pack having a plurality of battery modules;
  a plurality of shunt circuits coupled to said battery modules, respectively; and
  control circuitry coupled to said battery modules and said shunt circuits, and operable for detecting a fault and controlling a shunt circuit to shunt a current around a battery module if said fault occurs in said battery module,
  wherein said current flows from a negative terminal of said battery module to ,a positive terminal of said battery module through said shunt circuit if said fault occurs during a discharging process of said battery pack, and wherein said current flows from said positive terminal of said battery module to said negative terminal of said battery module through said shunt circuit if said fault occurs during a charging process of said battery pack.

15. The circuit of claim 14, wherein said control circuitry is operable for detecting a module voltage across said battery module and for comparing said module voltage with a voltage threshold to determine presence of said fault.

16. The circuit of claim 14, wherein said control circuitry is operable for detecting a voltage change rate of a module voltage across said battery module to determine presence of said fault.

17. The circuit of claim 14, wherein said battery modules are coupled in Series, and wherein said fault comprises an open circuited condition in the series-coupled battery modules.

18. The circuit of claim 14, wherein said hunt circuit comprises a bidirectional current path.

19. The circuit of claim 14, wherein said bidirectional current path comprises a first switch and a second switch coupled in series, a first diode coupled in parallel with said first switch, and a second diode coupled in parallel with said second switch,
  wherein if said fault occurs during said discharging process, said first switch is off, said second switch is on, and said current flows though said first diode and said second switch,
  and wherein if said fault occurs during said charging process, said first switch is on, said second switch is off, and said current flows through said second diode and said first switch.

20. The circuit of claim 14, wherein said bidirectional current path is selected from the group consisting of a silicon-controlled rectifier (SCR) and a triode alternating current (TRIAL) switch.

* * * * *